March 4, 1941.   F. H. B. STELZER   2,233,493
MANUFACTURE OF CIGARS
Filed May 29, 1936   7 Sheets-Sheet 1

INVENTOR
FRANZ H. B. STELZER
BY C. A. Goepel
ATTORNEY.

March 4, 1941.   F. H. B. STELZER   2,233,493
MANUFACTURE OF CIGARS
Filed May 29, 1936   7 Sheets-Sheet 2

INVENTOR
FRANZ H. B. STELZER

BY C. P. Goepel
ATTORNEY

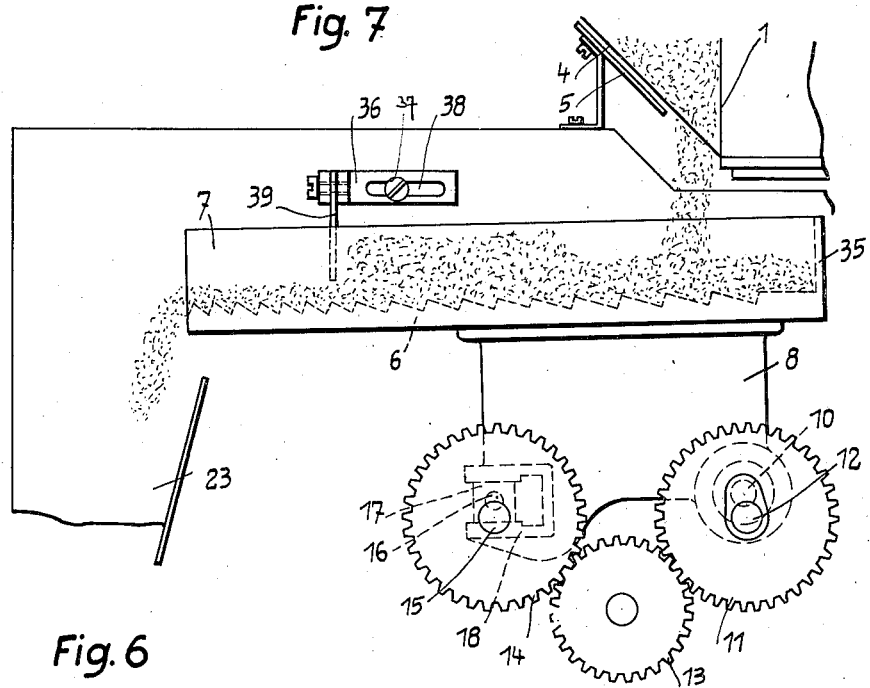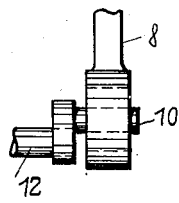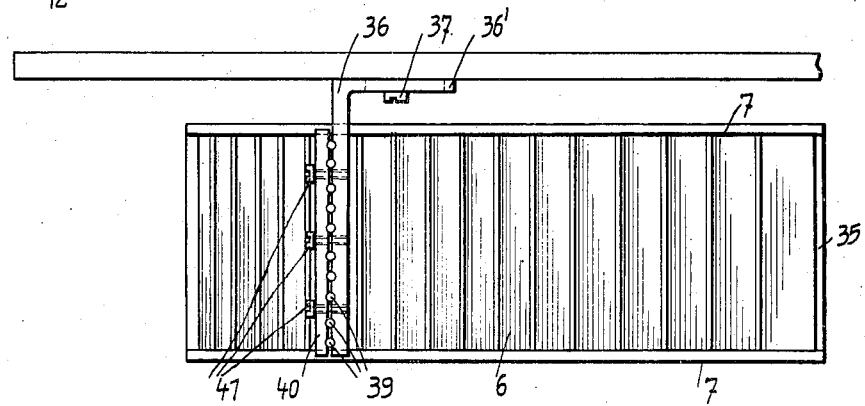

March 4, 1941. F. H. B. STELZER 2,233,493
MANUFACTURE OF CIGARS
Filed May 29, 1936 7 Sheets-Sheet 4

INVENTOR
FRANZ H. B. STELZER
BY C. P. Goepel.
ATTORNEY

March 4, 1941.  F. H. B. STELZER  2,233,493
MANUFACTURE OF CIGARS
Filed May 29, 1936  7 Sheets-Sheet 5

INVENTOR
FRANZ H. B. STELZER

ATTORNEY

March 4, 1941.   F. H. B. STELZER   2,233,493
MANUFACTURE OF CIGARS
Filed May 29, 1936   7 Sheets-Sheet 7

INVENTOR
FRANZ H. B. STELZER
BY C. P. Goepel
ATTORNEY

Patented Mar. 4, 1941

2,233,493

UNITED STATES PATENT OFFICE 2,233,493

MANUFACTURE OF CIGARS

Franz Heinrich Benno Stelzer, Dresden, Germany, assignor to "Universelle" Cigarettenmaschinen-Fabrik J. C. Mueller & Co., Dresden, Germany Application May 29, 1936, Serial No. 82,595
In Germany June 3, 1935

1 Claim. (Cl. 131—81)

This invention relates to the manufacture of cigars and more particularly to the distribution of the filler to the shaping means for the cigars.

An object of this invention is to provide an improved means for feeding the filler for the cigar to the shaping means so that the filler will be evenly conveyed to the shaping means.

Another object of this invention is to provide in a device of this kind means for periodically discharging tobacco to the shaping means, the tobacco to be discharged being received in a hopper after having been evenly discharged into the hopper.

A further object of this invention is to provide means for initially forming the filler in the form of a ribbon which may be compressed sufficiently to retain its formation in the receiving hopper and from which predetermined quantities are discharged for conveyance to the shaping means.

With the foregoing and other objects in view, the invention will be more fully described hereinafter, and will be more particularly pointed out in the claim appended hereto.

In the drawings, wherein like symbols refer to like or corresponding parts throughout the several views:

Figure 6 is a fragmentary end elevation of the eccentric operating means for the shaking trough.

Figure 7 is an enlarged vertical section, partly in elevation of the device and showing one form of smoothing means for the tobacco within the shaking trough.

Figure 8 is a fragmentary top plan of the frame of the device and the shaking trough.

Figure 1:
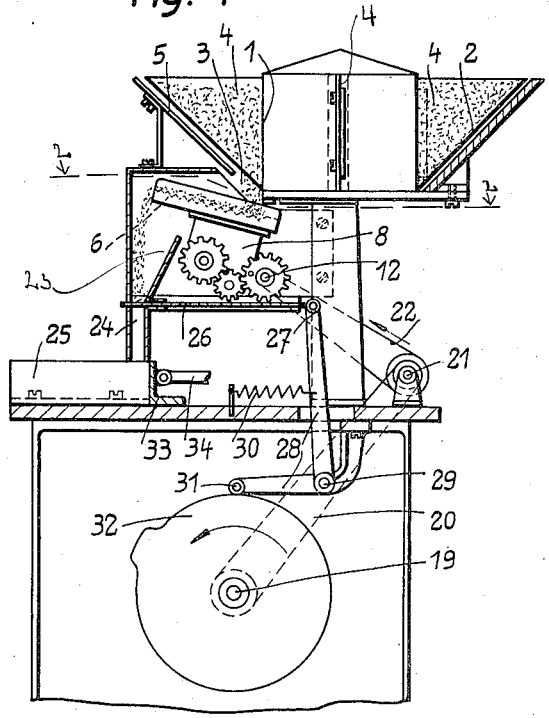
Figure 1 is a vertical section, partly in detail of a device constructed according to an embodiment of this invention.
Figure 2:
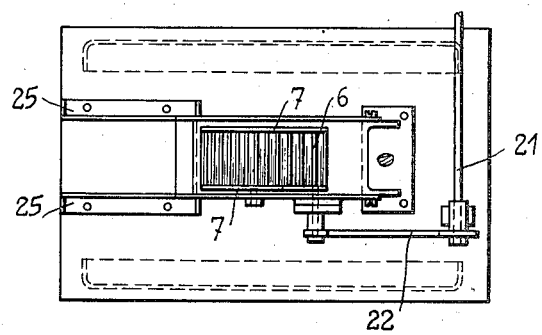
Figure 2 is a sectional view, partly in detail, taken on the line 2—2 of Fig. 1.

Referring to the drawings, and first to Figs. 1 to 4 inclusive, the numeral 2 designates a hopper 20 which is stationary and which is constructed in the form of a truncated cone disposed in inverted position. The hopper 2 is provided with a discharge opening 3 which is regulated as to size by means of a plate or valve 5. Tobacco is discharged into the hopper 2 from above, and the loose tobacco in the hopper 2 is rotated by means of radial fins or blades 4 which are secured to a centrally disposed body 1 which is secured to a drive shaft and operated from a suitable operating means (not shown).

Figure 5:
Figure 5 is an enlarged longitudinal section through the shaking trough.

An agitating trough 6 is disposed below the discharge opening 3 of the hopper 2 and is provided with upstanding side walls 7. The trough 6 is provided with a plurality of transversely extending ribs 6a, which as shown in Fig. 5 increase in number per unit of length in the direction of the movement of the tobacco thereover. The ribs 6a as shown in the drawings, are less in number per unit length at the receiving end of the trough 6 than at the outlet end thereof, for the reason that at the receiving end the tobacco fed thereto by the hopper 2 is of greater depth than at the outlet end of the trough, and is also agitated to a greater extent at the receiving end of the trough than at the outlet end thereof, the amplitude of the elliptical path being larger at the receiving end of the trough than at the outlet end thereof. The trough 6 is mounted on a frame member 8, and the rear end of the frame 8 is mounted on an eccentrically disposed crank or shaft 10 which is secured to a shaft 12. The shaft 12 has a gear 11 secured thereto, and this gear 11 meshes with an intermediate gear 13. The intermediate gear 13 meshes with a forward gear 14 mounted on a shaft 15 fixed to the frame of the device, and the shaft 15 is provided with an eccentrically disposed shaft 16 which is mounted in a slidable block 17. The block 17 slides in a guide 18 carried by the forward end of the frame 8. The block 17 is slidable in the guide 18 in order to allow the frame 8 to reciprocate in accordance with the movements given thereto by the eccentric 10.

Figure 3:
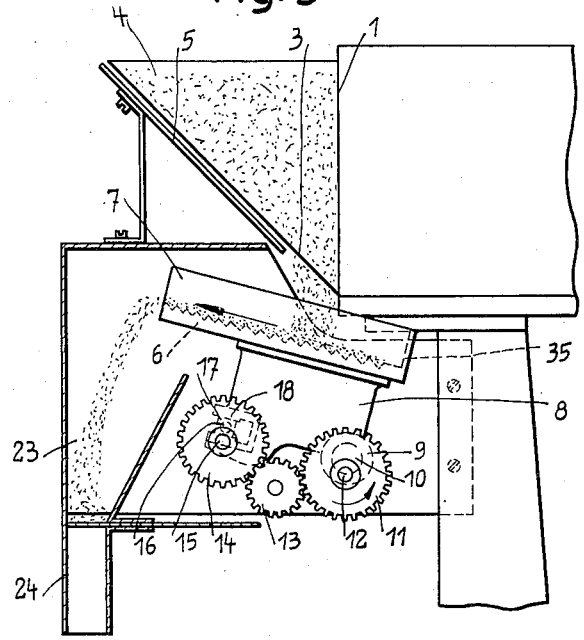
Figure 3 is an enlarged fragmentary vertical section of the device, showing the shaking trough in its uppermost position.
Figure 4:
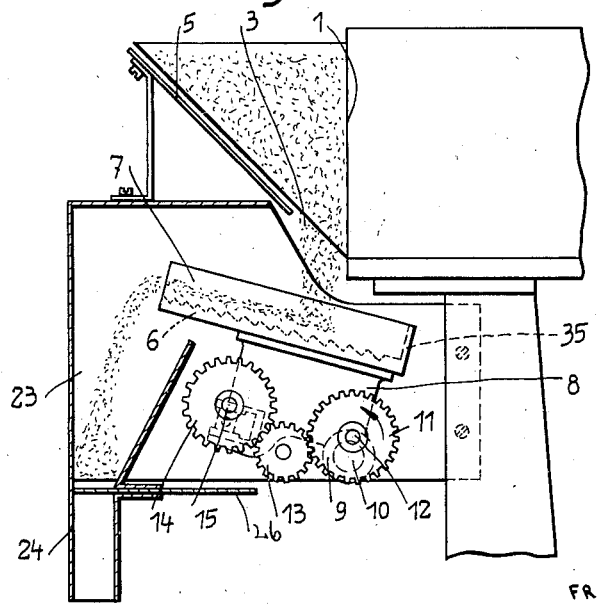
Figure 4 is a view similar to Fig. 3 but showing the shaking trough in a lower position.

The shaft 12 is rotated from a drive shaft 21 by means of a belt 22 or the like, the shaft 21 being connected to a suitable power means (not shown). When the shaft 12 is rotated the trough 6 is given a rocking motion as well as a forward and rearward motion so that the tobacco discharged onto the trough 6 will be gradually forced forwardly over the ribs 6a. The rear end of the trough 6 is closed by a rear wall 35, as shown in Figs. 3 and 4, whereas the forward or discharge end of the trough is open and discharges the tobacco in a ribbon into a receiving hopper 23, the walls of which converge in a downward direction. The tobacco flow which is discharged from the trough 6 takes on a contour such as shown in Figure 11a, of elliptical shape, in conformity with the movement of the discharge end of the trough 6, which flow has a greater width than depth, and which flow of tobacco moves to the shaping device with such contour.

A vertically disposed passage 24 is disposed beneath the hopper 23 and discharges into a shaping channel 25. A valve or gate 26 is disposed between the bottom of the hopper 23 and the top of the passage 24, and this valve 26 is connected as at 27 to the upper end of a bell crank 28 which is mounted on a pivot 29 carried by the frame of the device. The lower arm of the bell crank 28 is provided with a roller 31 which engages an eccentric 32 mounted on a shaft 19. The shaft 19 is rotated by means of a belt 20 or the like which is trained over a pulley or the like carried by the drive shaft 21.

The lower arm of the bell crank 28 is maintained in contact with the eccentric 32 by means of a contracting spring 30. The shaping channel 25 has a pusher or slide member 33 movable therein, and this pusher 33 is moved by means of a rod 34 which is operated in a well known manner.

In Fig. 3 the bearings 9 and 17 for the trough supporting member 8 are shown in their uppermost position, and in Fig. 4 these bearings are shown in their lowermost position. In the device shown in Figs. 1 to 4 inclusive, no compressing means is used with the trough 6.

Referring now to Figs. 7 and 8, the tobacco which is discharged into the trough 6 is evened off by means of a rake constructed in the form of a plurality of vertically disposed spaced apart tines or rods 39 which are secured to the arm 36 of a bracket 36' of L-shape. A clamping bar 40 which is secured to the arm 36 by means of bolts 41 or the like holds the tines or rods 39 in adjusted position over the trough 6. The bracket 36' is provided with an elongated slot 38 through which a bolt 37 engages so that the rake may be adjusted relative to the discharge end of the trough 6.

Figure 9:
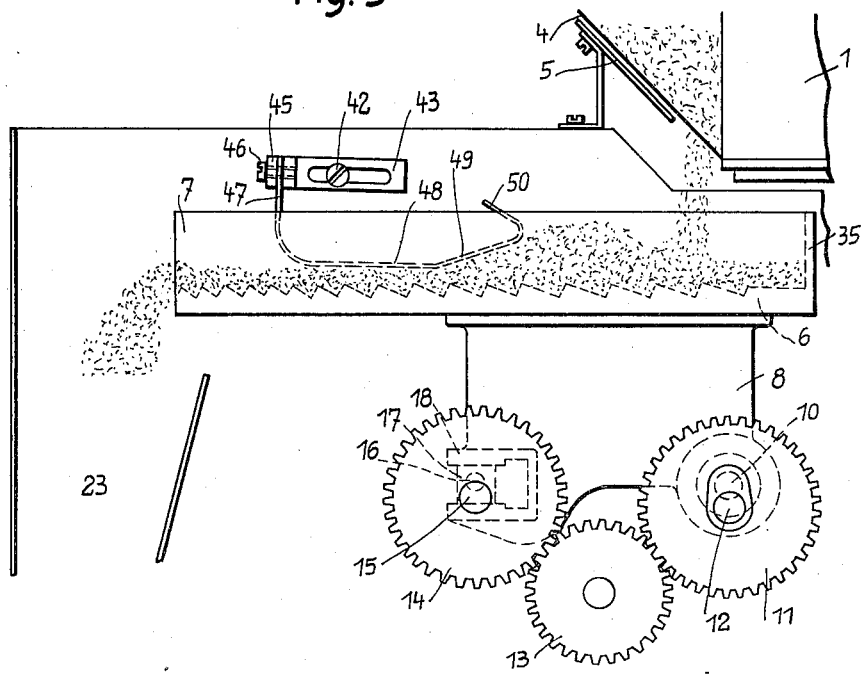
Figure 9 is an enlarged vertical section, partly in elevation, of the device and showing another form of smoothing and compressing means for the tobacco within the trough.
Figure 10:
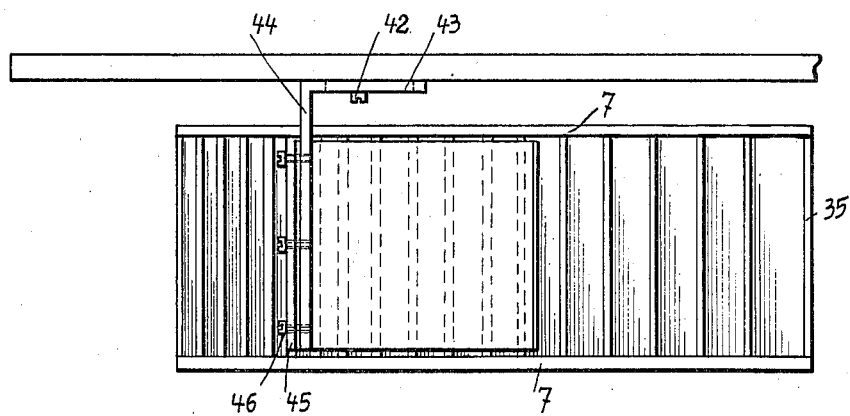
Figure 10 is a plan view of the trough and compressing means shown in Fig. 9.

In Figs. 9 and 10 there is shown a device similar to that disclosed in Figs. 1 to 4 inclusive, but in Figs. 9 and 10 there is shown a combined tobacco smoothing and compressing means overlying the trough 6. An L-shaped bracket 43—44 is secured to the frame of the device by means of an adjusting bolt 42, and bolts 46 engage through a clamping bar 45 which holds the upright leg 47 of the tobacco smoothing and compressing member onto the bracket 43—44. This smoothing and compressing member is provided wtih a substantially horizontal portion 48 which is bent upwardly as at 49. This upwardly extending portion 49 constitutes the smoothing and compressing portion of the member secured to the bracket 43—44 and the upper end of the extension 49 is bent reversely as at 50. As the trough 6 moves forwardly beneath the smoothing and compressing member 47, 48, 49, 50 the tobacco is smoothed out and compressed into a ribbon of desired thickness which is subsequently discharged over the forward end of the trough 6.

Figure 11:
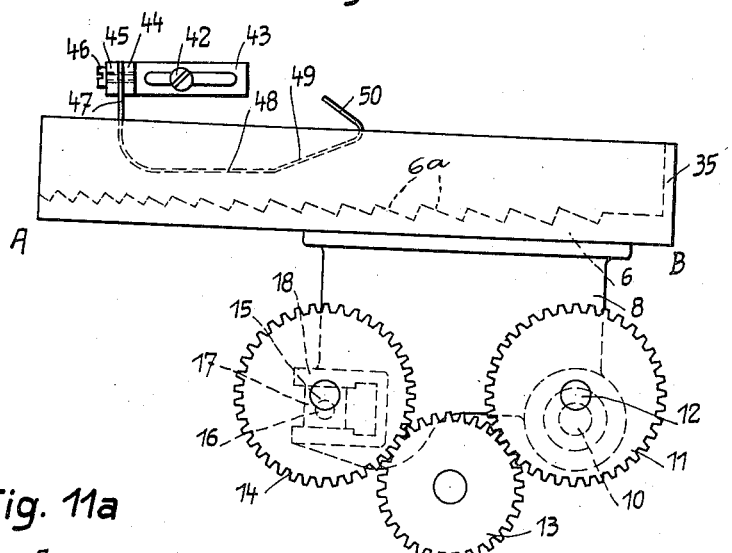
Figure 11 is a detail side elevation of the trough and compressing means shown in Fig. 9.
Figure 11A:
Figure 11a is a diagrammatic view showing the line of travel of the discharge end of the trough.
Figure 11B:
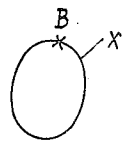
Figure 11b is a diagrammatic view showing the line of travel of the receiving end of the trough.
Figure 6A:
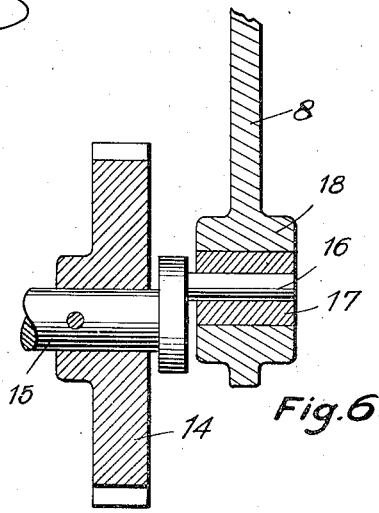
Figure 6a is a detail sketch showing the action of the members 8, 14, 15, 16, 17 and 18.

Fig. 11 shows the trough 6 with the operating means therefor and the combined smoothing and compressing device embodied in Figs. 9 and 10. Fig. 11a shows by a horizontal ellipse $y$ the path of the forward or discharge end of the trough, and Fig. 11b shows by a substantially vertically disposed ellipse $x$ the path of the rear or receiving end B of the trough 6.

Figure 12:
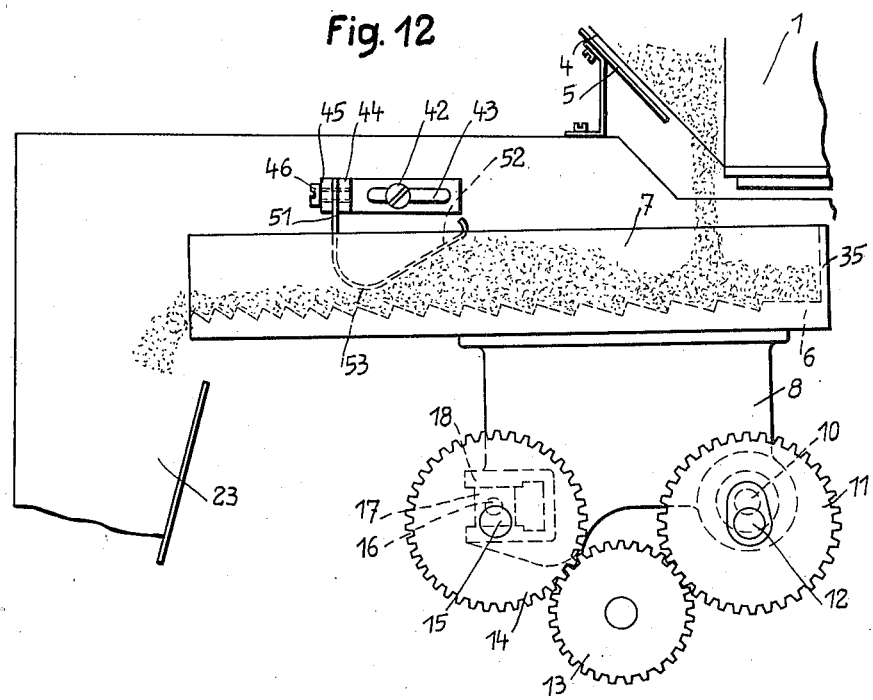
Figure 12 is a fragmentary enlarged vertical section, partly in detail, of the device with another form of smoothing and compressing means combined with the chute.
Figure 13:
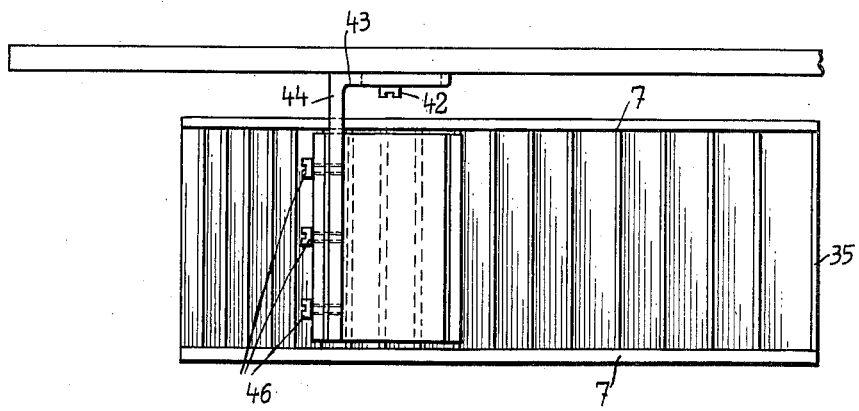
Figure 13 is a top plan of the trough and compressing means shown in Fig. 12.

The tobacco may also be smoothed and compressed in its movement through the trough 6, as shown in Figs. 12 and 13 by means of a sheet of metal having an upright portion 51 which is secured to the same type of bracket 43—44 shown in Figs. 9 and 10. This sheet of metal is bent arcuately as at 53, and then extended upwardly in a straight line as at 52.

Figure 14:
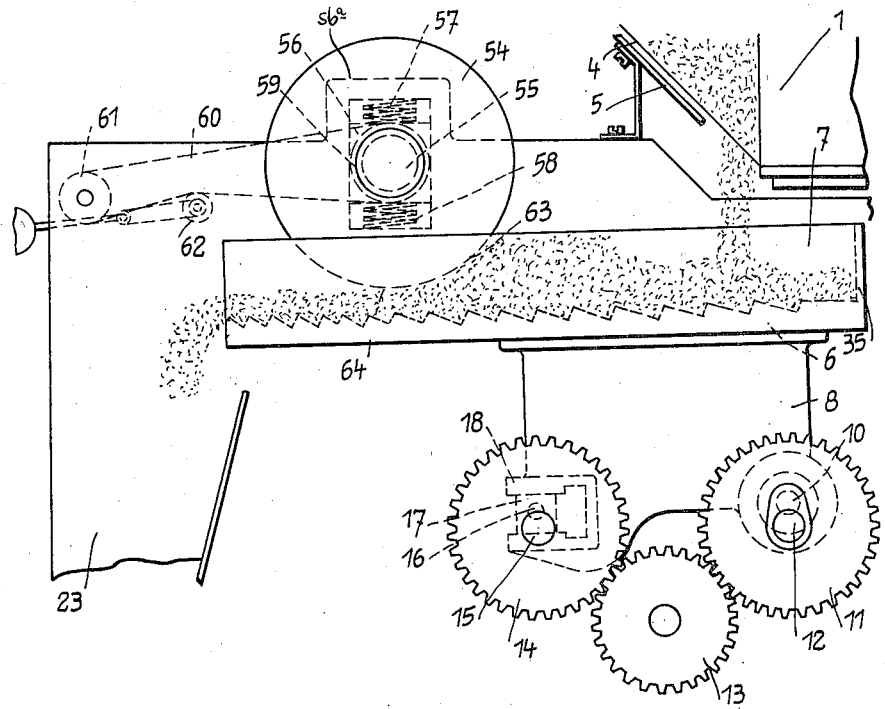
Figure 14 is a fragmentary enlarged vertical section, partly in detail, of the device with a further form of smoothing and compressing means combined with the trough.
Figure 15:
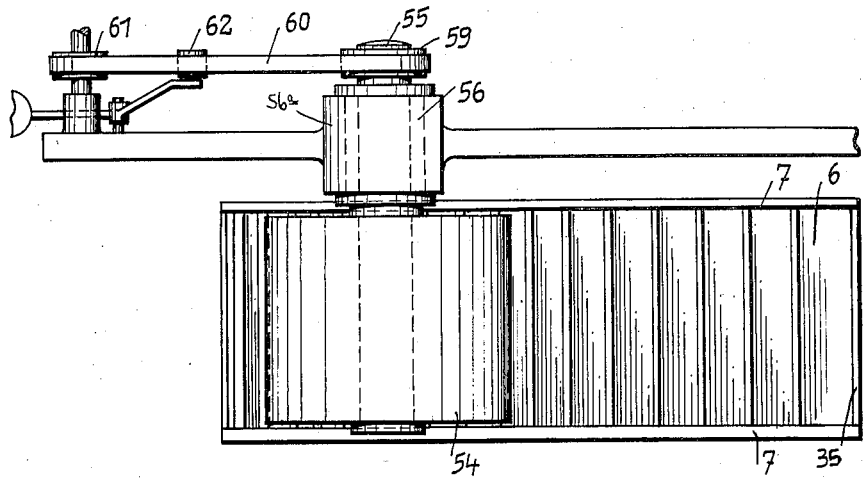
Figure 15 is a top plan of the trough and compressing means shown in Fig. 14.

The tobacco discharged into the trough 6 may also be smoothed out and compressed by means of a rotatable drum or roller 54, as shown in Figs. 14 and 15. This drum 54 is mounted on a shaft 55 which is journalled in slidable bearings 56. The bearings 56 are slidable in guides 56a carried by the frame of the device, and springs 57 and 58 engage on opposite sides of the bearing block 56. A pulley 59 is secured to the shaft 55 and a belt 60 is trained over this pulley 59 and also over a drive pulley 61. An idler pulley 62 engages the belt 60 between the pulleys 59 and 61 and maintains the belt 60 in taut condition. As shown in Fig. 14 the numeral 63 indicates the compressing and smoothing side of the drum 54, and the numeral 64 indicates the bottom portion of the drum which determines the thickness of the ribbon of tobacco which is to be discharged into the receiving hopper 23. This drum 54 may be rotated either in the direction of the movement of the tobacco through the trough 6 or may be rotated reverse to the movement of the tobacco.

In the use and operation of this device, the loose and shredded tobacco is discharged into the truncated stationary hopper 2 and discharged therefrom under the action of the rotating blades 4 carried by the body 1. The tobacco from the stationary hopper 2 is discharged through the opening 3 onto the agitating member 6, and the toothed or ribbed upper surface of this member 6 will move the tobacco forwardly. The thickness of the ribbon of tobacco which is discharged from the forward end of the trough 6 may be regulated by means of the regulating devices shown in Figs. 7 to 15 inclusive. The cam 32 will effect opening of the valve or gate 26 at stated intervals so that the desired quantity of tobacco will be discharged into the shaping channel 25 where the pusher or slide member 33 will move the tobacco forwardly under the action of the rod 34.

This device will provide a means whereby the filler for the cigars may be evenly packed through a mechanical means, and in this manner a more uniform quality of filler may be obtained so that the shape of the cigar may be likewise made uniform.

The advantage gained by having fewer ribs per unit of length at the receiving end is that the amount of tobacco is largest at that point. On the other hand, the amplitude of vibration is smallest at the outlet end, and since the tobacco is there at its lowest depth being more and more compressed, due to the shaking, smaller ribs of greater number per unit length are used.

It is obvious that various changes and modifications may be made in the details of construction and design of the above specifically described embodiment of this invention without departing from the spirit thereof, such changes and modifications being restricted only by the scope of the following claim.

What is claimed is:

In a feeding means for a tobacco filler pressing machine, the combination of a feeding trough having a substantially horizontal floor, and having at one end a receiving end for receiving tobacco dropped thereon, and at the other end an outlet end discharging the tobacco at that end after it has been moved by the trough from its receiving end, said floor having a plurality of ribs extending transversely of the trough from the receiving end to the outlet end thereof, a frame below said trough for supporting it, with the trough extending forwardly of the frame, means for moving the lower part of the frame at its spaced lower ends, alternately up and down and forward and backward to give the trough a motion in an elliptical path, and a presser member supported independently of said trough near its outlet end having an open bight facing the tobacco as it is moved by the trough towards the presser, the movement of the trough being alternately towards and from said presser to alternately compress and loosen the tobacco between the presser and the trough, whereby the loose tobacco received at the receiving end is brought together in a ribbon-like discharge at the outlet end.

FRANZ HEINRICH BENNO STELZER.